United States Patent
Brandt

(10) Patent No.: US 9,136,910 B2
(45) Date of Patent: Sep. 15, 2015

(54) NETWORK NEIGHBOR ADMISSION COORDINATION SYSTEM AND METHOD FOR POWERLINE COMMUNICATION

(75) Inventor: David Dale Brandt, New Berlin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 754 days.

(21) Appl. No.: 13/277,696

(22) Filed: Oct. 20, 2011

(65) Prior Publication Data

US 2013/0100831 A1  Apr. 25, 2013

(51) Int. Cl.
*H04B 3/54* (2006.01)
*H04B 3/58* (2006.01)
*H04L 12/26* (2006.01)
*H04L 12/28* (2006.01)
*H04L 12/40* (2006.01)

(52) U.S. Cl.
CPC ............... *H04B 3/542* (2013.01); *H04B 3/58* (2013.01); *H04B 2203/5408* (2013.01); *H04L 43/0876* (2013.01); *H04L 2012/2843* (2013.01); *H04L 2012/4026* (2013.01); *Y04S 40/168* (2013.01)

(58) Field of Classification Search
CPC . H04L 41/0853; H04L 41/0896; H04B 3/542
USPC .......................................................... 370/252
See application file for complete search history.

(56) References Cited

U.S. PATENT DOCUMENTS

| | | | |
|---|---|---|---|
| 6,947,409 B2* | 9/2005 | Iwamura | 370/345 |
| 7,034,662 B2 | 4/2006 | Brandt et al. | |
| 7,512,122 B1* | 3/2009 | Olakangil et al. | 370/389 |
| 8,565,077 B2* | 10/2013 | Stahl | 370/230 |
| 2007/0159981 A1* | 7/2007 | Chang et al. | 370/252 |

* cited by examiner

*Primary Examiner* — Dang Ton
*Assistant Examiner* — Kevin Lee
(74) *Attorney, Agent, or Firm* — Fletcher Yoder P.C.

(57) ABSTRACT

Systems and methods are provided for enabling the deployment of powerline communication networks and associated nodes on a powerline, wherein existing powerline communication networks connected to the powerline are detected and interrogated to ascertain communication bandwidth utilization rates and other information relating to the existing powerline communication networks and their associated nodes. The ability to detect the existence of powerline communication networks connected to the powerline, and to ascertain information relating to these existing powerline communication networks enables the new powerline communication network to be deployed on the powerline such that communication bandwidth allocation configuration settings for the new powerline communication network are met or exceeded.

15 Claims, 4 Drawing Sheets

NETWORK NEIGHBOR ADMISSION COORDINATION SYSTEM AND METHOD FOR POWERLINE COMMUNICATION

BACKGROUND

The invention relates generally to the field of power and data distribution within a networked system. More specifically, the invention relates to the coordination of powerline communication networks.

BRIEF DESCRIPTION

In a number of industrial applications, automation devices (e.g., motor drives, input/output (I/O) interfaces, programmable logic controllers (PLCs), operator interfaces, and so forth) function together in a networked manner. These various automation devices are integrated together across the network and each generally require power and communication functionality. In conventional applications, separate power and communications networks are typically used to provide the power and communication capabilities to the automation devices. However, some conventional techniques employ powerline communication, whereby communication data is distributed across the power network. As such, the power and communication networks are essentially combined into a single network infrastructure. However, it is now recognized that communication bandwidth across the powerline communication networks may be somewhat limited. This may be especially true when new powerline communication networks are established in areas where existing powerline communication networks have already been established. As such, it is now recognized that there is a need for improved coordination of powerline communication networks.

DRAWINGS

These and other features, aspects, and advantages of the present invention will become better understood when the following detailed description is read with reference to the accompanying drawings in which like characters represent like parts throughout the drawings, wherein.

Figure 3:
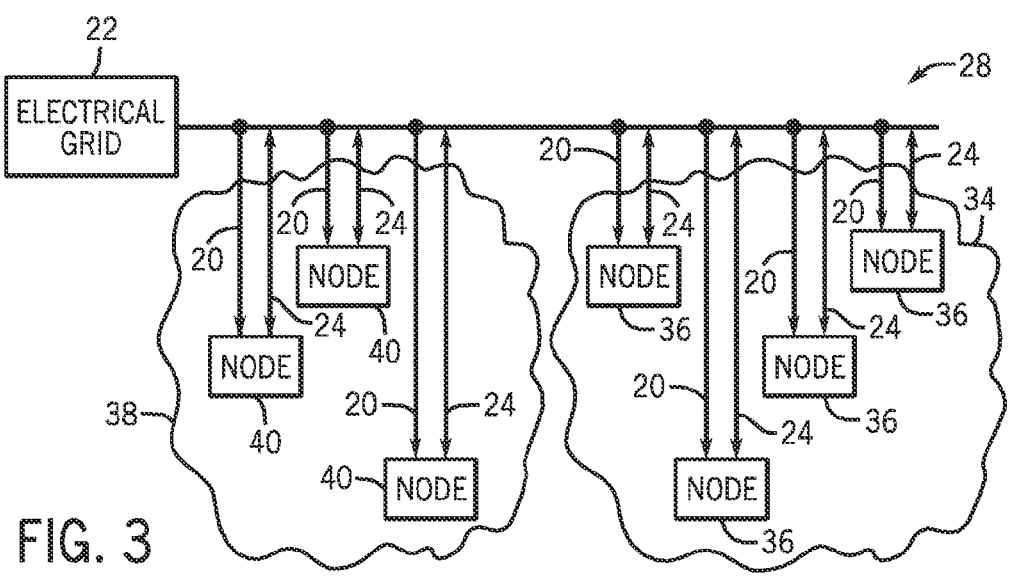
FIG. 3 is a schematic diagram of a powerline that includes an existing powerline communication network having a plurality of nodes and a new powerline communication network having a plurality of nodes in accordance with the present techniques.
Figure 4:
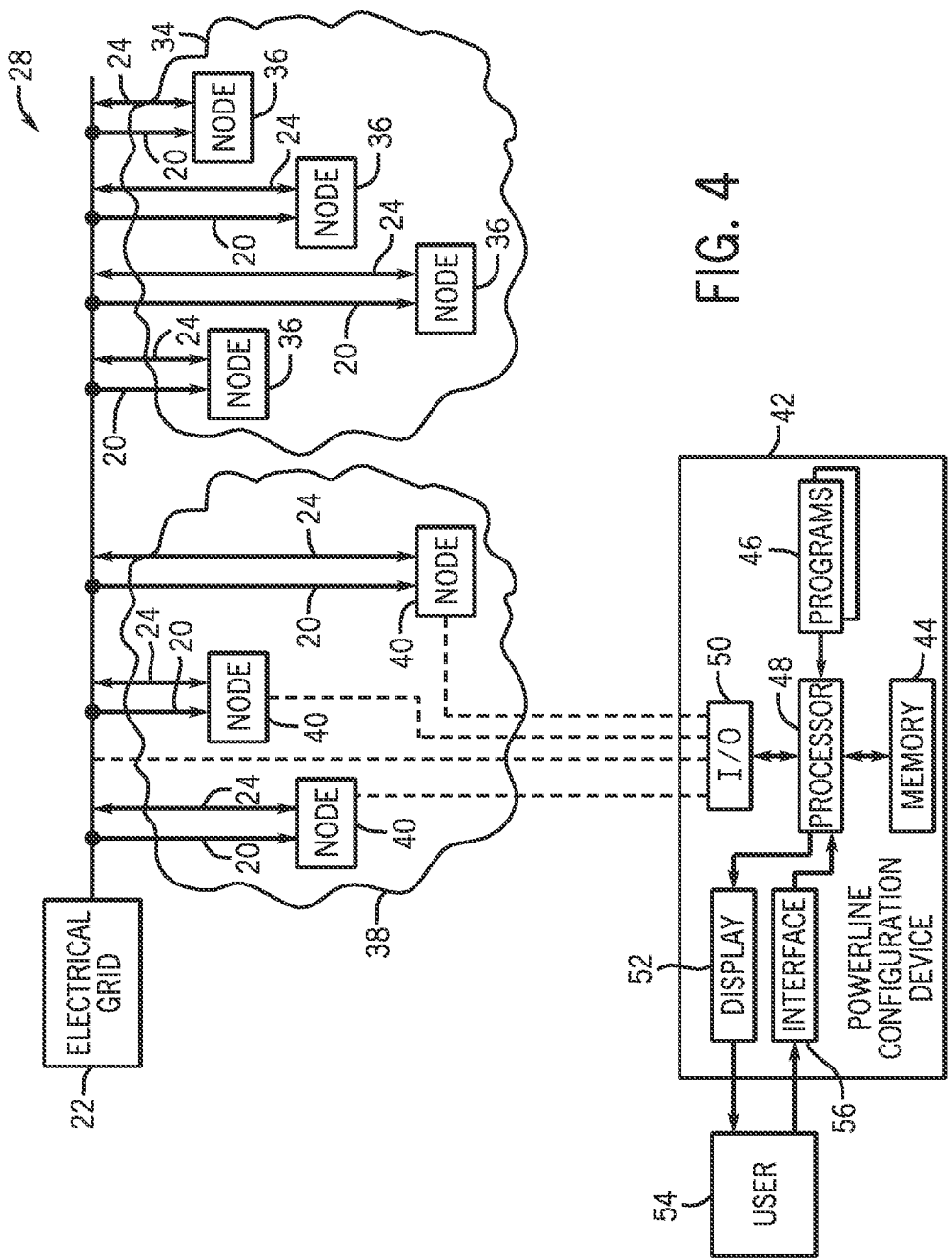
Figure 5:
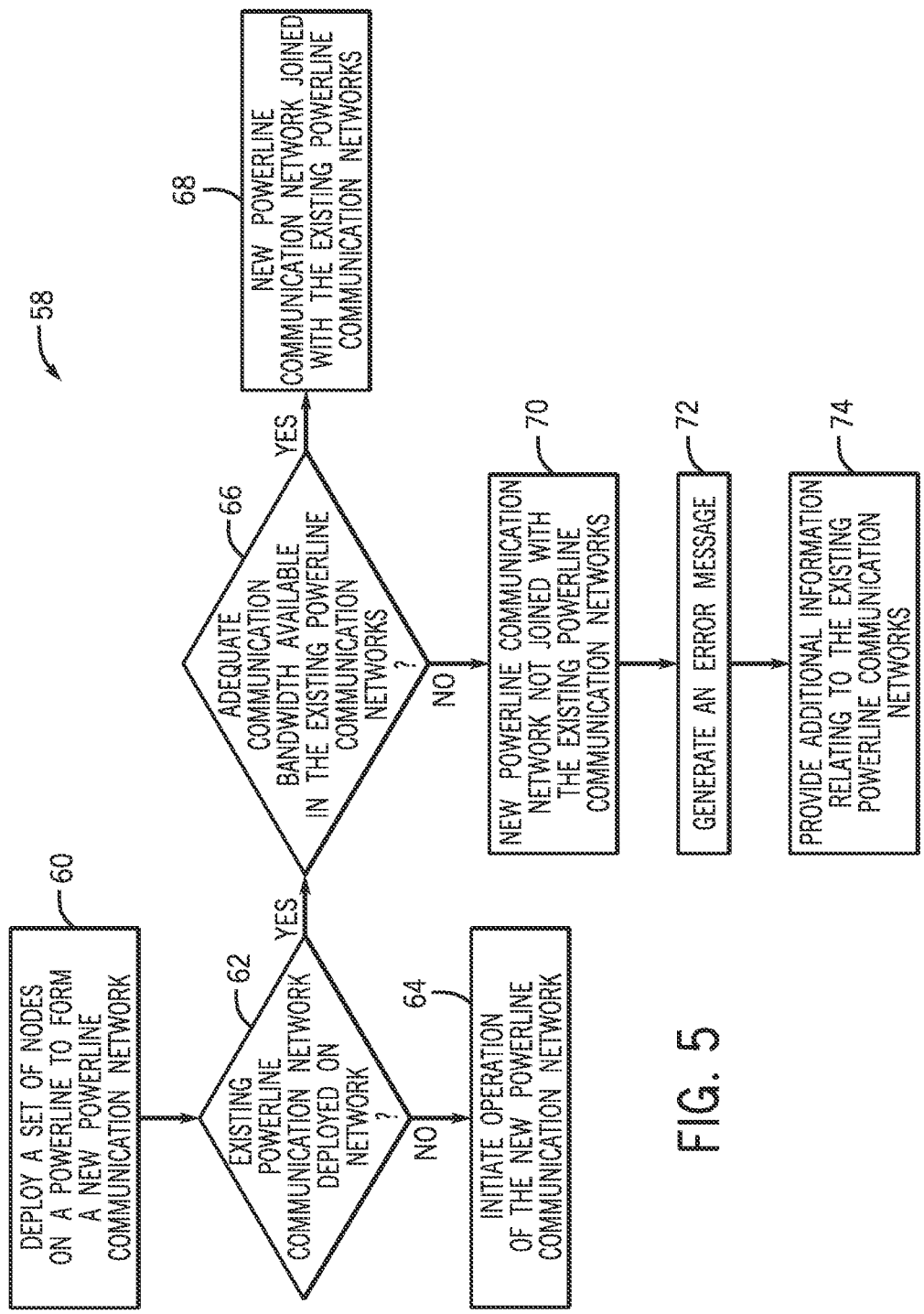

FIG. 4 is a schematic diagram of the powerline of FIG. 3, illustrating a powerline configuration device being used to configure the new powerline communication network for use with the existing powerline communication network in accordance with the present techniques; and FIG. 5 is a process flow diagram of a method for deploying a new powerline communication network on an existing powerline in accordance with the present techniques.

DETAILED DESCRIPTION

It is now recognized that communication bandwidth available across powerline communication networks can often be somewhat limited. The embodiments described herein are directed towards systems and methods for improved communication between powerline communication networks, such that communication bandwidth between devices connected to the powerline communication networks may be coordinated to increase bandwidth utilization efficiency relative to traditional powerline communication networks. More specifically, in certain embodiments, when a new powerline communication network is connected to a powerline, a powerline configuration device may be used to automatically detect whether existing powerline communication networks are deployed or actively operating on the powerline and, if so, interrogate one or more devices associated with the existing powerline communication networks to ascertain communication bandwidth utilization of the devices, as well as other information relating to the existing powerline communication networks and the associated devices. The ability to actively detect and interrogate other powerline communication networks connected to a powerline enables enhanced coordination of communication bandwidth among the devices connected to the powerline communication networks.

Figure 1:
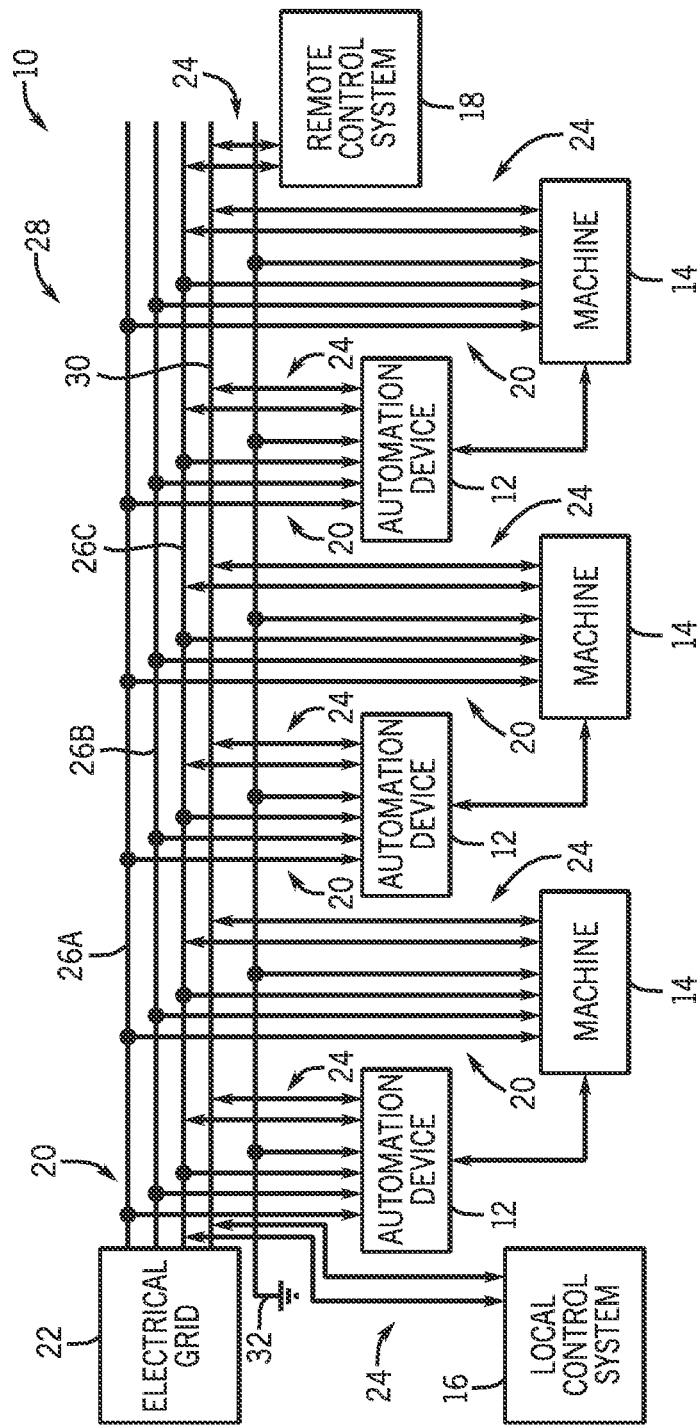
FIG. 1 is a schematic diagram of an industrial process that includes a plurality of automation devices in accordance with the present techniques.

Turning now to the drawings, FIG. 1 is a schematic diagram of an industrial process 10 that includes a plurality of automation devices 12 in accordance with the present techniques. For example, the automation devices 12 may include one or more drives, motors, motor controllers, push buttons, signaling devices, relays, timers, sensors, switches, signal conditioning devices, circuit and load protection devices, energy monitoring devices, lighting and motion control devices, power supplies, input/output (I/O) interfaces for integrating the automation devices 12, programmable logic controllers (PLCs), operator interfaces, and so forth. The machines 14 may include equipment specific to the industrial process 10. For example, if the industrial process 10 is a bottling process, the machines 14 may include bottling equipment; if the industrial process 10 is an automotive process, the machines 14 may include automotive equipment; and so forth. In other words, the automation devices 12 may generally be used between different industrial processes 10, whereas the machines 14 used by the particular industrial process 10 are generally specific to the particular industrial process 10. In addition to the automation devices 12 illustrated in FIG. 1, which are used to directly control the machines 14 of the industrial process 10, the industrial process 10 may also receive and/or transmit information to and from other local and/or remote control systems 16, 18.

As discussed above, the automation devices 12 of the industrial process 10 require both power to keep the automation devices 12 running, and a communication network through which the automation devices 12 may communicate with each other, as well as with the other local control systems 16 and/or remote control systems 18. In conventional automation systems, automation devices would often receive power from an electrical power grid, whereas data transmissions (e.g., either wired or wireless data transmissions) to and from the automation devices would be transmitted via an entirely separate communications network, such as a telecommunications network. However, maintaining the connections necessary for both receiving power from the electrical grid and transmitting and receiving data through the separate communications network can become costly from an infrastructure standpoint. This can be especially true where communications networks are either not readily available, or would be prohibitively expensive to establish (e.g., in remote locations, in confined spaces, and so forth).

One method for eliminating the need for separate power and communications networks is to use powerline communication networks. Powerline communication networks function by transmitting and receiving data through existing power networks. For example, as illustrated in FIG. 1, power 20 may be delivered to both the automation devices 12 and the machines 14 of the industrial process 10 from a plurality of power conductors 26A, 26B, 26C of a powerline 28 that is connected to the electrical power grid 22. For example, as illustrated in FIG. 1, the power conductors 26A, 26B, 26C may each be configured to conduct a respective phase of three-phase alternating current (AC) power. In addition, the powerline 28 may also include a neutral conductor 30 and a ground conductor 32 coupled to the ground. In certain embodiments, data 24 may be transmitted to and from the automation devices 12 and the machines 14 of the industrial process 10 over one of the power conductors 26A, 26B, 26C and the neutral conductor 30.

As illustrated in FIG. 1, the third power conductor 26C is used to transmit the data 24. However, the first and second power conductors 26A, 26B may also be used to transmit the data 24. The communication of data 24 through the powerline 28 may be accomplished in various ways. For example, in certain embodiments, powerline communication may be shared using division of time techniques. However, in other embodiments, powerline communication may be shared using division of frequency bands. Certain aspects for transmitting data 24 through the powerline 28 as described herein may be found in U.S. Pat. No. 7,034,662 to Brandt et al., which is incorporated by reference in its entirety.

It should be noted that while the embodiment illustrated in FIG. 1 depicts powerline communication over three-phase AC powerlines, other types of powerlines, such as 24-volt direct current (DC) or other types of DC powerlines, may utilize the techniques described herein. As such, the techniques described herein may prove beneficial for facilities that use distributed generation of high voltage DC power, such as microgrids. In addition, the embodiment illustrated in FIG. 1 (as well as FIGS. 2-4) depicts a single power segment (e.g., the powerline 28 connected to the electrical grid 22). However, grids from two or more transformers may have 100% of the bandwidth available in each power segment. As such, as described in greater detail below, additional power segments may be added to increase bandwidth. However, in other embodiments, the additional power segments may already exist, such that they may be utilized to distribute bandwidth when needed. In other words, the embodiment illustrated in FIG. 1 is merely exemplary, and is not intended to be limiting.

As described in greater detail below, the automation devices 12 of the industrial process 10 may be configured as part of a powerline network connected to the powerline 28. More specifically, the automation devices 12 of the industrial process 10 may be configured to be deployed (e.g., instantiated, configured, and so forth) as a powerline network on the powerline 28 such that the automation devices 12 of the industrial process 10 are capable of detecting the presence of existing powerline networks that are connected to the powerline 28.

One method of detection is to detect other powerline networks of a known type. The powerline networks may form automatically, and discover other powerline networks. One device connected to the powerline networks may act as a channel coordinator, broadcasting a beacon with information about the powerline network neighbors. If the other powerline network(s) are of the same type, certain protocols between channel coordinators are used to divide available bandwidth evenly, since there is no knowledge of the actual applications. However, knowledge within the automation applications (e.g., stored within the automation devices 12) may be used to divide the available bandwidth in an uneven manner to satisfy multiple applications. Certain protocols (e.g., that may be used over Ethernet, as one example) may be used to read powerline interface information that provides a list of existing powerline networks and an indication that bandwidth is being divided. In certain embodiments, the protocols may be extended to include methods for writing new divisions of bandwidth to the powerline interfaces. For example, one channel coordinator may be configured with bandwidth requirement information that may be used in negotiation with other channel coordinators to determine how to share available bandwidth.

Whenever automation devices 12 of the industrial process 10 are connected to the powerline 28, the automation devices 12 may be referred to as nodes of a powerline communication network. More specifically, in certain embodiments, the automation devices 12 may include unnumbered communication lines to their respective machines 14, through which I/O signals may be transmitted for controlling the machines 14. The machines 14 act as loads on the electrical grid 22 and may not have their own network interface. As an example, an output from an automation device 12 may drive a coil of a contactor to connect a machine motor to the electrical grid 22 as a load. As such, the automation devices 12 act as nodes of a powerline communication network, through which power is transmitted to and from the machines 14 that are controlled by the automation devices 12.

Figure 2:
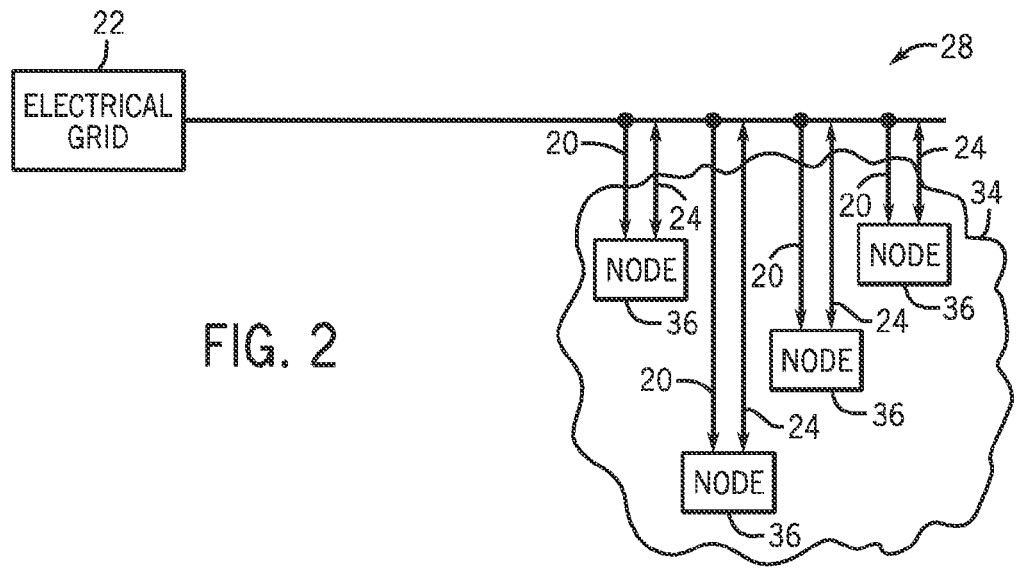
FIG. 2 is a schematic diagram of a powerline that includes a powerline communication network having a plurality of nodes in accordance with the present techniques.

FIG. 2 is a schematic diagram of the powerline 28 that includes a powerline communication network 34 having a plurality of nodes 36 (e.g., the actuation devices 12 of FIG. 1) in accordance with the present techniques. As illustrated, each of the nodes 36 receives power 20 from the powerline 28, and transmits data 24 to and from the powerline 28. The powerline communication network 34 is established by communicatively linking the nodes 36 together. In other words, each of the nodes 36 may be configured to communicate with each of the other nodes 36 associated with the respective powerline communication network 34. For example, when a set of nodes 36 configured to utilize powerline communication are connected to the powerline 28, the set of nodes 36 may be communicatively joined with other nodes 36 of the powerline communication network 34 if they are configured to be part of the same set of nodes 36. The set of nodes 36 of the powerline communication network 34 may, for example, be established through the use of a common security key, which resides in each of the nodes 36, and ensures the communication across the powerline 28 remains secure and private.

As will be appreciated, the powerline 28 may only be capable of supporting a certain amount of communication bandwidth. For example, due to physical limitations of the cabling of the powerline 28, only a certain amount of data 24 may be transmitted to and from the nodes 36 of the powerline communication network 34 by using the respective powerline 28. As such, if a new set of nodes configured to utilize powerline communication are connected to the powerline 28, but are not intended to be part of the powerline communication network 34, the new set of nodes may interfere with communication between the nodes 36 of the powerline communication network 34.

For example, FIG. 3 is a schematic diagram of the powerline 28 coupled with the existing powerline communication network 34 having the plurality of nodes 36 and a new powerline communication network 38 having a plurality of nodes 40 in accordance with the present techniques. This type of powerline 28 sharing may occur when the powerline communication networks 34, 38 are installed by users of the powerline 28 that share a common transformer. In this situation, the plurality of nodes 40 of the new powerline communication network 38 may be referred to as network neighbors of the plurality of nodes 36 of the existing powerline communication network 34. As described above, the nodes 36 of the existing powerline communication network 34 may be specifically configured to be part of the existing powerline communication network 34 using, for example, an existing common security key. Similarly, the nodes 40 of the new powerline communication network 38 may also be specifically configured to be part of the new powerline communication network 38 using, for example, a new common security that is different than the existing security key.

When the nodes 40 of the new powerline communication network 38 are connected to the powerline 28, one method for enabling the two powerline communication networks 34, 38 to coexist is to share the communication bandwidth equally. This allows for the two powerline communication networks 34, 38 to both continue operating, but at the expense of potential reductions in communication bandwidth throughput rates. Potentially, even more powerline communication networks may be installed, further dividing the available communication bandwidth through the powerline 28. In industrial processes, such as the industrial process 10 illustrated in FIG. 1, reduced communication bandwidth may interfere with real-time communication for certain applications, whereas reduced communication bandwidth may be perfectly acceptable for other applications. As such, it may be advantageous to coordinate communication bandwidth allocation between neighboring powerline communication networks 34, 38 connected to the common powerline 28, instead of allowing communication bandwidth to be passively shared.

One solution is to only deploy one powerline communication network 34, 38 in any given geographical area. Another solution is to actively coordinate communication bandwidth usage between applications that share the common powerline 28. However, this assumes that all parties are aware of other applications using the same powerline 28. A newly installed application may be unaware of legacy applications, and may benefit from an alert of the existence of the legacy usage. Another solution is to use independent powerline segments for each powerline communication network 34, 38, and to assure that there is only one powerline communication network 34, 38 per powerline segment using isolation modules. However, such modules add costs and require intimate understanding of the bounds of the powerline segment.

Another approach is to enable active detection of powerline communication networks 34, 38 existing on a powerline 28, including operating characteristics (e.g., current communication bandwidth usage, communication bandwidth allocation configuration settings, and so forth) of the powerline communication networks 34, 38 as well as the individual nodes 36, 40 of the powerline communication networks 34, 38. FIG. 4 is a schematic diagram of the powerline 28 of FIG. 3, illustrating a powerline configuration device 42 being used to configure the new powerline communication network 38 for use with the existing powerline communication network 34 in accordance with the present techniques. As described in greater detail below, the powerline configuration device 42 may be used to deploy the new powerline communication network 38 for use with the existing powerline communication network 34. For example, the powerline configuration device 42 may be configured to instantiate and configure (e.g., by setting network addresses, and so forth) the nodes 40 of the new powerline communication network 38.

The powerline configuration device 42 may preferably include a non-transitory computer readable memory medium 44 on which software programs 46 (e.g., computer code) according to the present techniques may be stored. The term "non-transitory computer readable memory medium" is intended to include various types of memory or storage, including an installation medium (e.g., a CD-ROM or floppy disks), a computer system memory or random access memory (e.g., DRAM, SRAM, and so forth), or a non-volatile memory such as a magnetic medium (e.g., a hard drive or optical storage). The non-transitory computer readable memory medium 44 may comprise other types of memory as well, or combinations thereof.

In addition, the powerline configuration device 42 may take various forms, including a programmed personal computer system, mainframe computer system, workstation, network appliance, Internet appliance, or other device. In general, the powerline configuration device 42 may be broadly defined to encompass any device having a processor 48 which executes instructions (e.g., the software programs 46) stored on the non-transitory computer readable memory medium 44. Indeed, in certain embodiments, the powerline configuration device 42 may actually be a module embedded within one or more of the individual nodes 40 (e.g., the actuation device 12 of the industrial process 10 of FIG. 1) of the new powerline communication network 38, and/or within one or more nodes 36 of the existing powerline communication network 34.

The non-transitory computer readable memory medium 44 may include computer code stored thereon. The computer code may include instructions for initiating operation of the new powerline communication network 38 on the powerline 28. In particular, the computer code may include instructions for performing any or all of the functions of the powerline configuration device 42 described herein. For example, the computer code may include instructions for detecting whether an existing powerline communication network 34 is deployed on the powerline 28, detecting operating characteristics of the existing powerline communication network 34 when the existing powerline communication network 34 is detected as being deployed on the powerline 28, and determining whether to initiate operation of the new powerline communication network 38 based on configuration settings of the new powerline communication network 38 and the operating characteristics of the existing powerline communication network 34, among other things.

In addition, in certain embodiments, the powerline configuration device 42 may include input/output (I/O) interfaces 50 that are connected directly to the powerline 28 or indirectly to the powerline 28 via one or more of the nodes 40 of the new powerline communication network 38. As described in greater detail below, the powerline configuration device 42 may include computer instructions for detecting the existence of powerline communication networks 34 connected to the powerline 28, as well as operating characteristics of any existing powerline communication networks 34 and/or associated nodes 36 connected to the powerline 28, using the I/O interfaces 50. In addition, the powerline configuration device 42 may include computer instructions for detecting other information relating to any existing powerline communication networks 34 and/or associated nodes 36 connected to the powerline 28, such as network identifiers for the existing powerline communication networks 34, communication bandwidth allocations for the existing powerline communication networks 34, media access control (MAC) addresses of devices (e.g., the nodes 36) of the existing powerline communication networks 34, and so forth.

Furthermore, in certain embodiments, the powerline configuration device 42 may include a display 52 for displaying information to a user 54 of the powerline configuration device 42, and one or more input interfaces 56 (e.g., a keyboard, mouse, touchscreen, trackpad, scanning device, and so forth, or any combination thereof) for receiving inputs from the user 54. For example, as described in greater detail below, the powerline configuration device 42 may be configured to receive configuration settings (e.g., communication bandwidth allocation configuration settings) for the new powerline communication network 38 and/or individual nodes 40 of the new powerline communication network 38 that have been entered by the user 54.

Generally speaking, the automation devices 12 of the individual nodes 36, 40 include the information relating to the required bandwidth for the node 36, 40. Nodes 36, 40 of the powerline communication networks 34, 38 are configured to read this information from each other. In addition, in certain embodiments, the bandwidth requirements for the nodes 36, 40 may be learned over time by monitoring operation of the nodes 36, 40 and storing the bandwidth usage of the nodes 36, 40 (e.g., in the powerline interfaces, in the nodes 36, 40 themselves, or in the powerline configuration device 42). Therefore, the distribution of bandwidth may be more dynamically adjusted based on changing operational needs of the nodes 36, 40.

Automation application traffic bandwidth is primarily periodic in nature, and is thus somewhat predictable with respect to required bandwidth (e.g., packets per second). In certain embodiments, the automation application traffic bandwidth may either be known from the application information, or may be learned from watching the traffic of the automation application (e.g., a set of automation devices 12 and associated machines 14 illustrated in FIG. 1). In certain situations, the topology of the powerline 28 may result in less available bandwidth than a theoretical maximum due to multi-path reflections and/or signal attenuation. In addition, the operation of the loads (e.g., self-interference) may also result in less available bandwidth. A reduction of bandwidth by the powerline adapters may compensate for topology and load-based interference impairments. Thus, the actual required bandwidth may be based both on the automation application demand and the channel characteristics, and should remain relatively fixed.

When a second automation application (e.g., a second set of automation devices 12 and associated machines 14) is added to the powerline 28, the second automation application will also have a respective periodic traffic bandwidth requirement. The nodes (e.g., the automation devices 12) and loads (e.g., the machines 14) of the second automation application are placed on the power segment and operated. The initial indication may be that there is adequate bandwidth for the second automation application. When this occurs, the second automation application adopts the available bandwidth along with some margin and, during initial operation, the second powerline network will reduce communication rates to compensate for topology and load-based interference. If the margin is adequate, the second automation application may then operate reliably within the available bandwidth.

The new communication should not interfere with the first automation application since the bandwidth is divided by time and/or frequency. However, the first automation application may have already had to make adjustments to the required bandwidth due to the act of adding the nodes and loads of the second automation application (e.g., even when they are not yet operating). When the second automation application is granted its initial bandwidth, the second automation application will operate its loads and adjust its required bandwidth to operate reliably with its own loads. The first automation application may also be operating its loads during this time period. The second automation application will adjust its bandwidth to operate reliably, given operation of the first automation applications loads. It should be noted that, unlike the communication, the loads can cause interference across time and channels.

Once the second automation application is operating, the second automation application loads may then interfere with the first automation application loads, causing increased error rates. The first automation application will then have to adjust its bandwidth requirement (e.g., up to its own margin limit) to ensure reliable operation. If the first automation application does not have adequate margin, the second automation application may be required to return bandwidth to the first automation application, and the process may repeat until both automation applications operate reliably or until only the first automation application operates reliably (e.g., as it originally did before the second automation application was added). In the latter situation, the second automation application may not be deployed due to inadequate bandwidth.

FIG. 5 is a process flow diagram of a method 58 for deploying a new powerline communication network 38 on an existing powerline 28 in accordance with the present techniques. As illustrated in FIG. 5, in step 60 of the method 58, a set of nodes 40 may be deployed on the powerline 28 to form the new powerline communication network 38. For example, as described above with respect to FIG. 1, the nodes 40 (e.g., actuation devices 12 of the industrial process 10 of FIG. 1) may be connected to the powerline 28 such that power 20 is received from the powerline 28, and data 24 may be transmitted to and from the powerline 28. In addition, the powerline configuration device 42 may be used to instantiate and configure (e.g., by setting network addresses, and so forth) the nodes 40 of the new powerline communication network 38. For example, as described above with respect to FIG. 4, deploying the set of nodes 40 to form the new powerline communication network 38 may include configuring the individual nodes 40, for example, by adding and/or configuring a common security key within each of the nodes 40. In addition, configuration settings may be set for each of the nodes 40. For example, a communication bandwidth allocation configuration setting may be set for each of the nodes 40 individually, as well as for the new powerline communication network 38 as a whole. In other words, both the individual nodes 40, as well as the new powerline communication network 38, may be configured with minimum and/or maximum communication bandwidth allocation settings, for example. These configuration settings may be set for the individual nodes 40 and/or the new powerline communication network 38 as a whole using the powerline configuration device 42, as described above with respect to FIG. 4.

Returning now to FIG. 5, in step 62 of the method 58, whether or not an existing powerline communication network 34 is deployed on the powerline 28 may be detected. For example, as described above, the powerline configuration device 42 may be configured to detect whether an existing powerline communication network 34 is connected to the powerline 28 within a defined area, such as a geographical area. More specifically, as described above, if an existing powerline communication network 34 is connected to the powerline 28 on a common side of a transformer with the new powerline communication network 38, the powerline configuration device 42 may detect that the existing powerline communication network 34 is deployed on the powerline 28. For example, in certain embodiments, the powerline configuration device 42 may ping for network addresses known to be associated with powerline nodes 36, 40.

In addition, assuming that one or more existing powerline communication networks 34 are deployed on the powerline 28, the powerline configuration device 42 may be configured to detect information (e.g., operating characteristics, configuration settings, and so forth) for the existing powerline communication networks 34 and/or associated nodes 36. For example, as described above, the powerline configuration device 42 may be configured to detect network identifiers for the existing powerline communication networks 34, communication bandwidth allocations for the existing powerline communication networks 34, MAC addresses of devices (e.g., the nodes 36) connected to the existing powerline communication networks 34, and so forth. For example, in certain embodiments, the powerline configuration device 42 may interrogate the known powerline nodes 36 to ask for and receive the specific information from the nodes 36.

In step 64 of the method 58, if no existing powerline communication networks 34 are detected as being deployed on the powerline 28, operation of the new powerline communication network 38 may be initiated. More specifically, assuming that adequate communication bandwidth is available on the powerline 28, the new powerline communication network 38 may be initiated utilizing the full communication bandwidth requirements consistent with the communication bandwidth allocation configuration settings for the new powerline communication network 38 and its associated nodes 40. In certain embodiments, even assuming that no existing powerline communication networks 34 are deployed on the powerline 28, the powerline configuration device 42 may be configured to detect what the available communication bandwidth is across the powerline 28, such that the communication bandwidth parameters of the new powerline communication network 38 and associated nodes may be adjusted to efficiently utilize available communication bandwidth constraints of the powerline 28.

Conversely, in step 66 of the method 58, if one or more existing powerline communication networks 34 are detected as being deployed on the powerline 28, a determination is made as to whether adequate communication bandwidth remains available in the existing powerline communication networks 34 to satisfy the communication bandwidth allocation configuration setting requirements for the new powerline communication network 38 and its associated nodes 40. In step 68 of the method 58, if a determination is made that adequate communication bandwidth remains available in the existing powerline communication networks 34 to satisfy the communication bandwidth allocation configuration setting requirements for the new powerline communication network 38 and its associated nodes 40, the new powerline communication network 38 may be joined with the existing powerline communication networks 34 on the powerline 28. In other words, the new powerline communication network 38 and the existing powerline communication networks 34 may be allowed to co-exist on the powerline 28.

Conversely, in step 70 of the method, if a determination is made that adequate communication bandwidth is not available in the existing powerline communication networks 34 to satisfy the communication bandwidth allocation configuration setting requirements for the new powerline communication network 38 and its associated nodes 40, the new powerline communication network 38 may not be joined with the existing powerline communication networks 34 on the powerline 28. In addition to not joining the new powerline communication network 38 with the existing powerline communication networks 34, additional analysis may be performed by the powerline configuration device 42. In certain embodiments, in step 72 of the method 58, an error message may be generated and conveyed to the user 54 of the powerline configuration device 42. For example, the error message may be displayed to the user 54 via the display 52 of the powerline configuration device 42. The error message may notify the user 54 that there is not sufficient communication bandwidth available in the existing powerline communication networks 34 to support addition of the new powerline communication network 38.

In addition, in certain embodiments, in step 74 of the method 58, additional information relating to the existing powerline communication networks 34 may be provided to the user 54 of the powerline configuration device 42. For example, this additional information may be displayed on the display 52 of the powerline configuration device 42 and may include information such as network identifiers for the existing powerline communication networks 34, communication bandwidth allocations for the existing powerline communication networks 34, MAC addresses of devices (e.g., the nodes 36) in the existing powerline communication networks 34, and so forth. Furthermore, other useful information, such as a network neighbor name and contact information may be provided. This additional information may be used by the user 54 to determine how to proceed with respect to the new powerline communication network 38. For example, in certain embodiments, a determination may be made to initiate the new powerline communication network 38 as a standalone powerline communication network. In addition, in certain embodiments, a determination may be made that one or more of the existing powerline networks 34 may be disabled.

Other possible actions may include adjusting the communication bandwidth usage of the nodes 36 of the existing powerline communication networks 34 to enable the communication bandwidth allocation configuration setting requirements for the new powerline communication network 38 to be satisfied. In general, adjusting the communication bandwidth usage of the existing powerline communication networks 34 and associated nodes 36 may only be done if the user 54 configuring the new powerline communication network 38 also has access to the existing powerline communication networks 34. As such, again, the security of the existing powerline communication networks 34 and their associated nodes 36 may be handled via security keys. For example, the security keys installed in the nodes 40 of the new powerline communication network 38 may be configured to identify and be identified by the security keys installed in the nodes 36 of the existing powerline communication networks 34.

In addition to enabling the detection and analysis of nodes 36 of existing powerline communication networks 34 on the particular powerline 28 during deployment of the new powerline communication network 38 on the powerline 28, the powerline configuration device 42 may also enable any nodes 36, 40 of powerline communication networks 34, 38 to detect current communication bandwidth allocation information of other nodes 36, 40 connected to the powerline 28 at any time. In addition, other information, such as network identifiers for the powerline communication networks 34, 38, communication bandwidth allocations for the powerline communication networks 34, 38, MAC addresses of devices (e.g., the other nodes 36, 40) connected to the powerline communication networks 34, 38, and so forth, may also be detected at any time by the nodes 36, 40. Again, assuming that the nodes 36, 40 have appropriate access (e.g., that security keys installed in the nodes 36, 40 enable access), the nodes 36, 40 may be enabled to adjust communication bandwidth utilization rates for other nodes 36, 40 connected to the common powerline 28.

Embodiments described herein enable the deployment of powerline communication networks and associated nodes on a powerline, wherein existing powerline communication networks connected to the powerline are detected and interrogated to ascertain communication bandwidth utilization rates and other information relating to the existing powerline communication networks and their associated nodes. The ability to detect the existence of powerline communication networks connected to the powerline, and to ascertain information relating to these existing powerline communication networks enables the new powerline communication network to be deployed on the powerline such that communication bandwidth allocation configuration settings for the new powerline communication network are met or exceeded. As such, the embodiments described herein enable deployment of powerline communication with less risk of unexpected performance-related issues due to lack of expected communication bandwidth. In addition, the embodiments described herein allow automation devices and equipment (e.g., the automation devices 12 and machines 14 of the industrial process 10 of FIG. 1) to be deployed with reduced interconnection costs compared to switches and cables, and without voltage compatibility concerns.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   detecting, via a powerline configuration device, whether at least one existing powerline communication network is deployed on a powerline;
   detecting, via the powerline configuration device, communication bandwidth requirements of the at least one existing powerline communication network when the at least one existing powerline communication network is detected as being deployed on the powerline;
   determining, via the powerline configuration device, whether to initiate operation of a new powerline communication network on the powerline based on communication bandwidth requirements for the new powerline communication network and the communication bandwidth requirements of the at least one existing powerline communication network, wherein determining whether to initiate operation of the new powerline communication network on the powerline comprises determining if adequate communication bandwidth is available on the powerline to satisfy the communication bandwidth requirements of the new powerline communication network;
   initiating, via the powerline configuration device, operation of the new powerline communication network on the powerline if adequate communication bandwidth is available on the powerline to satisfy the communication bandwidth requirements of the new powerline communication network; and
   adjusting, via the powerline configuration device, allocation of communication bandwidth between the at least one existing powerline communication network and the new powerline communication network to meet the communication bandwidth requirements of the at least one existing powerline communication network and the new powerline communication network, respectively, based on operating electrical loads on the at least one existing powerline communication network and the new powerline communication network after operation of the new powerline communication network is initiated, wherein the operating electrical loads create load-based interference that increases the communication bandwidth requirements of the at least one existing powerline communication network or the new powerline communication network.

2. The method of claim 1, comprising initiating, via the powerline configuration device, operation of the new powerline communication network such that the new powerline communication network utilizes communication bandwidth consistent with a communication bandwidth allocation configuration setting for the new powerline communication network if no existing powerline communication network is detected as being deployed on the powerline.

3. The method of claim 1, comprising not initiating, via the powerline configuration device, operation of the new powerline communication network on the powerline if adequate communication bandwidth is not available on the powerline to satisfy the communication bandwidth requirements the new powerline communication network.

4. The method of claim 1, comprising generating an error message on the powerline configuration device if adequate communication bandwidth is not available on the powerline to satisfy the communication bandwidth requirements for the new powerline communication network.

5. The method of claim 1, comprising providing information to the powerline configuration device relating to the at least one existing powerline communication network if adequate communication bandwidth is not available on the powerline to satisfy the communication bandwidth requirements for the new powerline communication network.

6. The method of claim 5, comprising providing a network identifier for the at least one existing powerline communication network, communication bandwidth allocation for the at least one existing powerline communication network, and MAC addresses of devices in the at least one existing powerline communication network to the powerline configuration device if adequate communication bandwidth is not available on the powerline to satisfy the communication bandwidth requirements for the new powerline communication network.

7. The method of claim 1, comprising initiating, via the powerline configuration device, the new powerline communication network as a standalone powerline communication network if adequate communication bandwidth is not available on the powerline to satisfy the communication bandwidth requirements for the new powerline communication network.

8. A powerline configuration device, comprising:
   a non-transitory computer readable medium comprising computer code stored thereon, wherein the computer code comprises instructions for initiating operation of a new powerline communication network on a powerline, the instructions comprising:
     instructions for determining whether to initiate operation of the new powerline communication network based on communication bandwidth requirements for the new powerline communication network and communication bandwidth requirements for at least one existing powerline communication network;
     instructions for initiating operation of the new powerline communication network on the powerline if adequate communication bandwidth is available on the powerline to satisfy the communication bandwidth requirements of the new powerline communication network; and instructions for adjusting allocation of communication bandwidth between the at least one existing powerline communication network and the new powerline communication network to meet the communication bandwidth requirements of the at least one existing powerline communication network and the new powerline communication network, respectively, based on operating electrical loads on the at least one existing powerline communication network and the new powerline communication network after operation of the new powerline communication network is initiated, wherein the operating electrical loads create load-based interference that increases the communication bandwidth requirements of the at least one existing powerline communication network or the new powerline communication network.

9. The powerline configuration device of claim 8, wherein the computer code comprises instructions for initiating operation of the new powerline communication network such that the new powerline communication network utilizes communication bandwidth consistent with a communication bandwidth allocation configuration setting for the new powerline communication network if no existing powerline communication network is detected as being deployed on the powerline.

10. The powerline configuration device of claim 8, wherein the computer code comprises instructions for determining if adequate communication bandwidth is available on the powerline to satisfy a communication bandwidth allocation configuration setting for the new powerline communication network if the at least one existing powerline communication network is detected as being deployed on the powerline.

11. The powerline configuration device of claim 10, wherein the computer code comprises instructions for not initiating operation of the new powerline communication network on the powerline if adequate communication bandwidth is not available on the powerline to satisfy the communication bandwidth allocation configuration setting for the new powerline communication network.

12. The powerline configuration device of claim 10, wherein the computer code comprises instructions for generating an error message if adequate communication bandwidth is not available on the powerline to satisfy the communication bandwidth allocation configuration setting for the new powerline communication network.

13. The powerline configuration device of claim 10, wherein the computer code comprises instructions for displaying information relating to the at least one existing powerline communication network if adequate communication bandwidth is not available on the powerline to satisfy the communication bandwidth allocation configuration setting for the new powerline communication network.

14. The powerline configuration device of claim 13, wherein the computer code comprises instructions for displaying a network identifier for the at least one existing powerline communication network, communication bandwidth allocation for the at least one existing powerline communication network, and MAC addresses of devices in the at least one existing powerline communication network if adequate communication bandwidth is not available on the powerline to satisfy the communication bandwidth allocation configuration setting for the new powerline communication network.

15. The powerline configuration device of claim 10, wherein the computer code comprises instructions for initiating the new powerline communication network as a standalone powerline communication network if adequate communication bandwidth is not available on the powerline to satisfy the communication bandwidth allocation configuration setting for the new powerline communication network.

\* \* \* \* \*